(12) United States Patent
Yang

(10) Patent No.: US 7,554,172 B2
(45) Date of Patent: Jun. 30, 2009

(54) MULTI-DIRECTIONAL MULTIPLEXING RADIUS CONVERGENCE ELECTRODE

(76) Inventor: Tai-Her Yang, No. 59, Chung Hsing 8 St., Si-Hu Town, Dzan-Hwa (TW)

( * ) Notice: Subject to any disclaimer, the term of this patent is extended or adjusted under 35 U.S.C. 154(b) by 491 days.

(21) Appl. No.: 11/100,420

(22) Filed: Apr. 7, 2005

(65) Prior Publication Data

US 2006/0226757 A1  Oct. 12, 2006

(51) Int. Cl.
*H01L 27/08* (2006.01)
(52) U.S. Cl. ............... 257/528; 257/E23.026; 257/531; 257/534; 257/538; 361/117; 361/306.3; 429/233; 313/414
(58) Field of Classification Search ............ 257/734, 257/751, E23.026, E23.187, E29.009, E21.004, 257/534, 528, 531, 538; 361/117, 306.3, 361/311, 309; 338/21; 313/414; 429/241, 429/211, 101, 126, 233, 160; 219/121.68
See application file for complete search history.

(56) References Cited

U.S. PATENT DOCUMENTS

| 2,585,729 | A | * | 2/1952 | Berman | 210/495 |
| 4,975,674 | A | * | 12/1990 | Sumiyoshi et al. | 338/21 |
| 6,950,300 | B2 | * | 9/2005 | Sutardja | 361/306.3 |

* cited by examiner

*Primary Examiner*—Chris C. Chu
(74) *Attorney, Agent, or Firm*—Rabin & Berdo, P.C.

(57) ABSTRACT

An electrode plate for an electricity storage and discharge device, which includes a plurality of I/O convergence terminals evenly distributed along a periphery of the electrode plate, and a plurality of conductive structures, each conductive structure for one of the I/O convergence terminals, wherein each conductive structure is of a radial pattern that centers on the one of the I/O convergence terminals, and radiates towards the interior of the electrode plate.

4 Claims, 6 Drawing Sheets

US 7,554,172 B2

MULTI-DIRECTIONAL MULTIPLEXING RADIUS CONVERGENCE ELECTRODE

BACKGROUND OF THE INVENTION (a) Field of the Invention

The present invention is related to an electrode plate with a multi-directional radial I/O convergence structure, and more particularly, to one that improves the equalization of I/O current flows and reduces internal impedance when the electrode plate of an electricity storage and discharging device is discharged or charged by amplified large current.

(b) Description of the Prior Art

An electrode plate of a conventional electricity storage device generally has a single I/O convergence terminal installed at one side of the electrode plate, or has multiple I/O convergence terminals installed at one side of the electrode plate. Conductors are arranged in grill pattern or in radial pattern for the terminals of the electrode plate to converge current. Hence, the I/O current of each electrode plate concentrates on a single side of the electrode plate. Therefore, if there is a large current, the region close to the terminal and the region farther away from the terminal will have different current densities, thus deteriorating the performance of the device. The same applies to an electrode plate with multiple I/O convergence terminals.

SUMMARY OF THE INVENTION

The primary purpose of the present invention is to provide an electrode plate with a multi-directional radial convergence structure. The electrode plate is specifically provided for an electricity storage and discharge device. The individual convergence terminals are arranged on the periphery of the electrode plate, so as to form a plurality of multi-directional conductive current convergence structures in radial pattern. The current convergence structures thus improve the equalization of the general I/O current flows of the electrode plate of the electricity storage and discharge device, and to reduce the internal impedance.

DETAILED DESCRIPTION OF THE PREFERRED EMBODIMENTS

The internal consumption of the conventional electricity storage and discharging device increases when outputting large current or being charged with large current. An electrode plate with a multi-directional radial convergence structure of the present invention improves the equalization of I/O current flows and reduces the internal impedance when the electrode plate of the electricity storage and discharge device is outputting large current or being charged with large current.

The electrode plate in the construction of a multi-directional, radial convergence structure of the present invention is specifically provided for an electricity storage and discharge device. It has individual convergence terminals evenly distributed on periphery of the electrode plate in all directions, so as to form a plurality of multi-directional conductive structures in radial pattern to provide equalized I/O current flows and to reduce the internal impedance.

Figure 1:
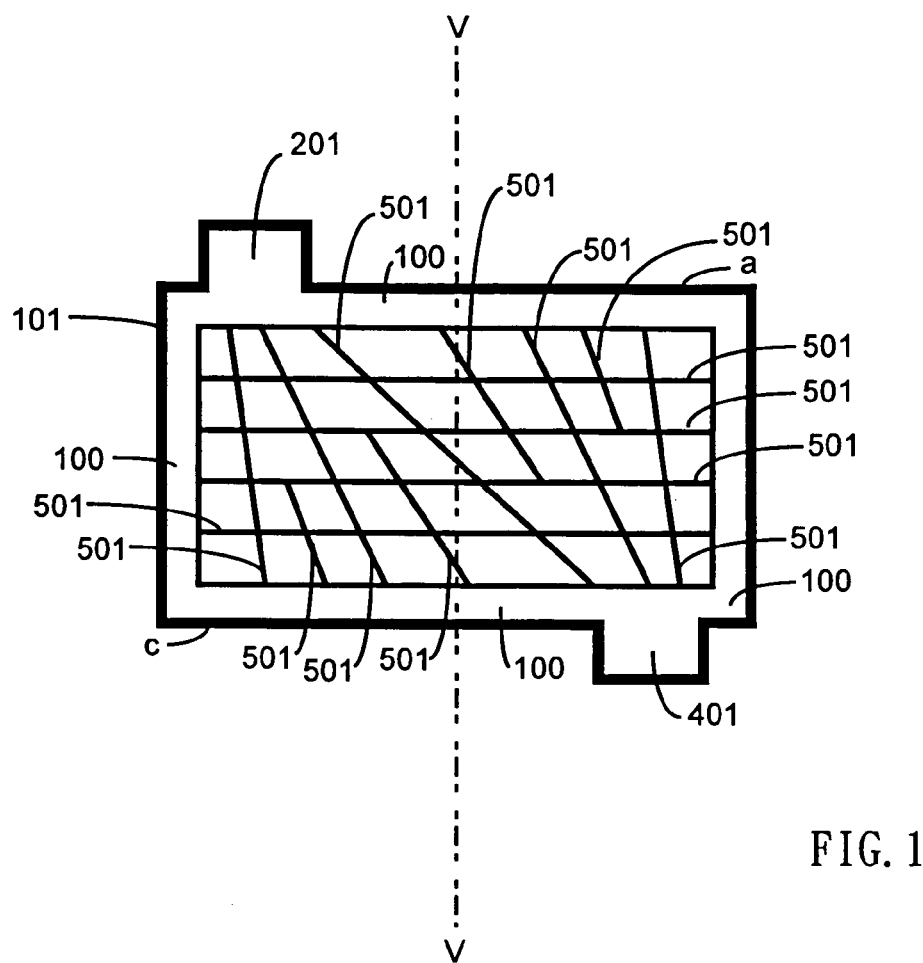
FIG. 1 is schematic view showing a preferred embodiment of the present invention, wherein an electrode plate with a multi-directional convergence structure in radial pattern is provided with an I/O convergence terminal on each of the two opposite sides of the electrode plate.

FIG. 1 is schematic view showing a preferred embodiment of the present invention, wherein an electrode plate with a multi-directional convergence structure in radial pattern is provided with an I/O convergence terminal on each of the two opposite sides of the electrode plate.

Figure 2:
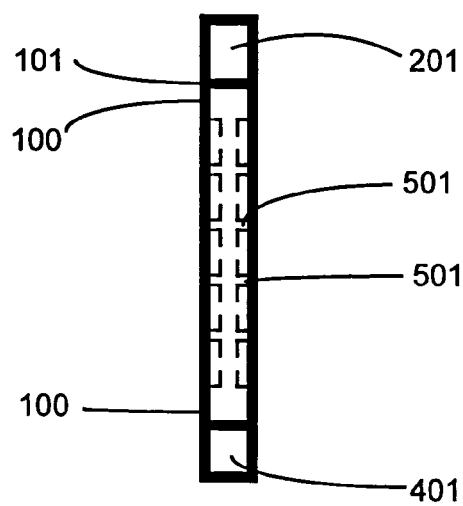
FIG. 2 is a side view of the electrode plate in FIG. 1.

FIG. 2 is a side view of the electrode plate in FIG. 1.

As illustrated in FIGS. 1 and 2 of the preferred embodiment, a conductive frame 100 forms four sides of an electrode plate 101. On side a of the electrode plate 101, an I/O terminal 201 is disposed at one side of a longitudinal central line V of the electrode plate 101. Another I/O terminal 401 is provided on side c, opposite to side a, diagonal to the I/O terminal 201 on the other side of the longitudinal central line V. Respectively having the I/O terminals 201, 401 as centers, multiple conductive structures 501 are distributed in a mesh pattern on the electrode plate 101 and diffusing in radial towards their opposite sides.

Figure 3:
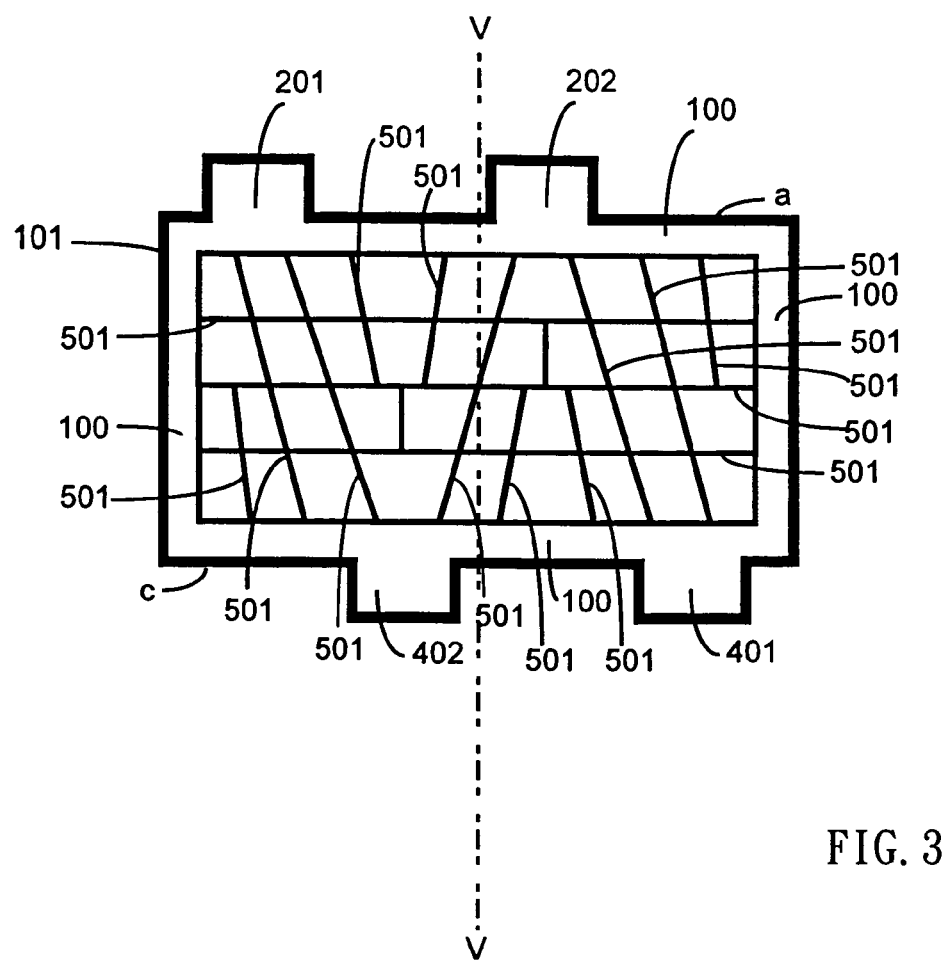
FIG. 3 is a schematic view showing a preferred embodiment of the present invention, wherein an electrode plate with a multi-directional convergence structure in radial pattern is provided with two I/O convergence terminals on each of the two opposite sides of the electrode plate.

FIG. 3 is a schematic view showing a preferred embodiment of the present invention, wherein an electrode plate with a multi-directional convergence structure in radial pattern is provided with two I/O convergence terminals on each of the two sides of the electrode plate.

Figure 4:
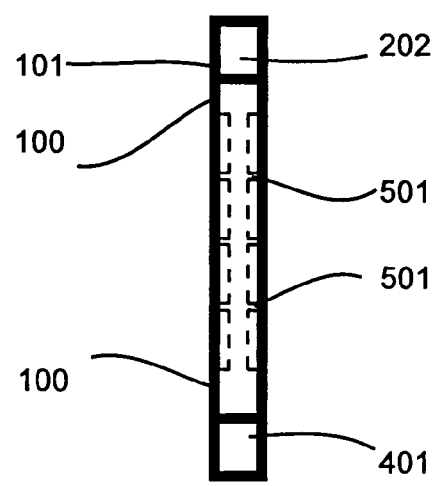
FIG. 4 is a side view of the electrode plate in FIG. 3.

FIG. 4 is a side view of the electrode plate in FIG. 3.

As illustrated in FIGS. 3 and 4 of the preferred embodiment of the present invention, a conductive frame 100 forms four sides of an electrode plate 101. On side a of the electrode plate 101, two I/O terminals 201, 202 are respectively disposed on both sides of the longitudinal central line V of the electrode plate 101. Two I/O terminals 401, 402 are provided on side c, opposite to side a, respectively diagonal to the I/O terminals 201, 202. Respectively having I/O terminals 201, 202, 401 and 402 as centers, multiple conductive structures 501 are distributed in a mesh pattern on the electrode plate 101 and diffusing in radial towards their opposite sides.

Figure 5:
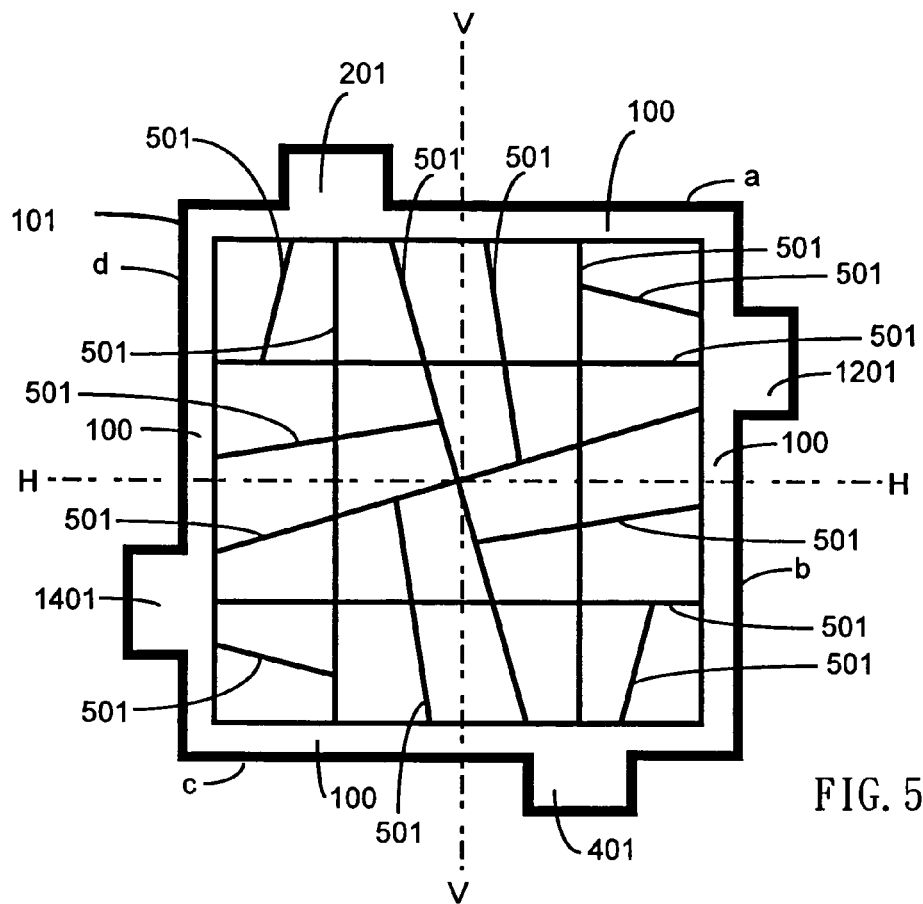
FIG. 5 is a schematic view showing a preferred embodiment of the present invention, wherein an electrode plate with a multi-directional convergence structure in radial pattern is provided with an I/O convergence terminal on each of the four sides of the electrode plate.

FIG. 5 is a schematic view showing a preferred embodiment of the present invention, wherein an electrode plate with a multi-directional convergence structure in radial pattern is provided with an I/O convergence terminal on each of the four sides of the electrode plate.

Figure 6:
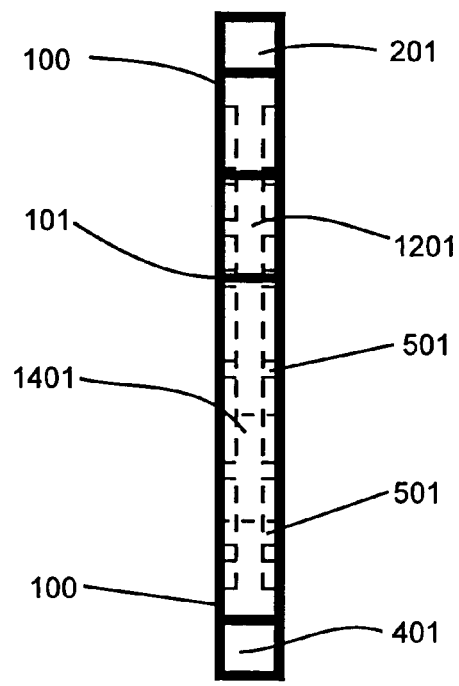
FIG. 6 is a side view of the electrode plate in FIG. 5.

FIG. 6 is a side view of the electrode plate in FIG. 5.

As illustrated in FIGS. 5 and 6 of the preferred embodiment of the present invention, a conductive frame 100 forms four sides of an electrode plate 101. On side a of the electrode plate 101, an I/O terminal 201 is disposed at one side of a longitudinal central line V of the electrode plate 101. Another I/O terminal 401 is provided on side c, opposite to side a, diagonal to the I/O terminal 201 on the other side of the longitudinal central line V. Respectively having the I/O terminals 201, and 401 as centers, multiple conductive structures 501 are distributed in a mesh pattern on the electrode plate 101 and diffusing in radial towards their opposite sides.

Meanwhile, on side b of the electrode plate 101, an I/O terminal 1201 is disposed at one side of a horizontal central line H of the electrode plate 101. Another I/O terminal 1401 is provided on side d, opposite to side b, diagonal to the I/O terminal 1201 on the other side of the horizontal central line H. Respectively having the I/O terminals 1201 and 1401 as centers, multiple conductive structures 501 are distributed in a mesh pattern on the electrode plate 101 and diffusing in radial towards their opposite sides.

Figure 7:
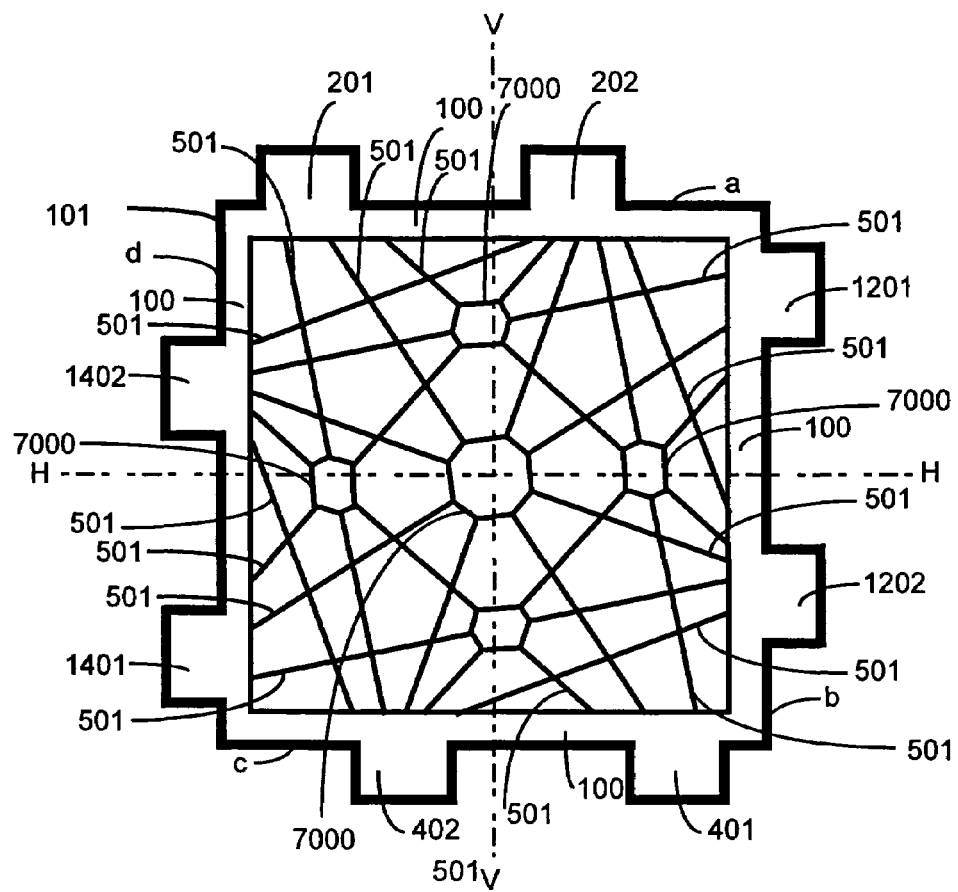
FIG. 7 is a schematic view showing a preferred embodiment of the present invention, wherein an electrode plate with a multi-directional convergence structure in radial pattern is provided with two I/O convergence terminals on each of the four sides of the electrode plate.

FIG. 7 is a schematic view showing a preferred embodiment of the present invention, wherein an electrode plate with a multi-directional convergence structure in radial pattern is provided with two I/O convergence terminals on each of the four sides of the electrode plate.

Figure 8:
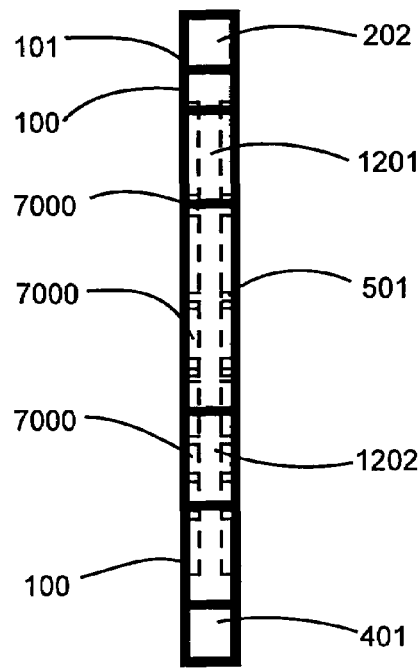
FIG. 8 is a side view of the electrode plate in FIG. 7.

FIG. 8 is a side view of the electrode plate in FIG. 7.

As illustrated in FIGS. 7 and 8 of the preferred embodiment of the present invention, a conductive frame 100 forms four sides of an electrode plate 101. On side a of the electrode plate 101, two I/O terminals 201, 202 are respectively disposed on both sides of the longitudinal central line V of the electrode plate 101. Two I/O terminals 401, 402 are provided on side c, opposite to side a, respectively diagonal to both I/O terminals 201, 202 on both sides of the longitudinal central line V. Respectively having both I/O terminals 201, 202, 401 and 402 as centers, multiple conductive structures 501 are distributed in a mesh pattern on the electrode plate 101 and diffusing in radial towards their opposite sides.

Meanwhile, on side b of the electrode plate 101, two I/O terminals 1201, 1202 are respectively disposed on both sides of the horizontal central line H of the electrode plate 101. Two I/O terminals 1401, 1402 are provided on side d, opposite to side b, respectively diagonal to both I/O terminals 1201, 1202 on both sides of the horizontal central line H. Respectively having both I/O terminals 1201, 1202, 1401 and 1402 as centers, multiple conductive structures 501 are distributed in a mesh pattern on the electrode plate 101 and diffusing in radial towards their opposite sides.

Figure 9:
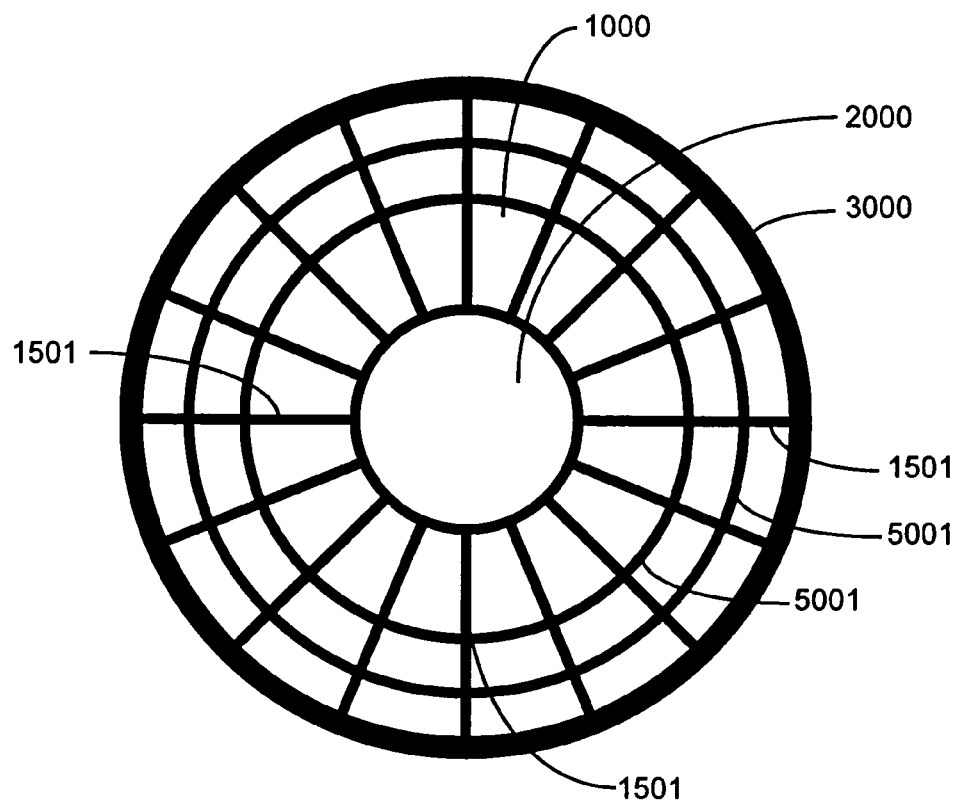
FIG. 9 is a schematic view showing a preferred embodiment of the present invention applied in an electrode plate with a multi-directional convergence structure in radial pattern having at its center provided with a circular through hole and having its outer circumference as an I/O terminal.

FIG. 9 is a schematic view showing a preferred embodiment of the present invention applied in an electrode plate with a multi-directional convergence construction in radial pattern, the construction has a through hole at its center, and uses its outer circumference as an I/O terminal.

Figure 10:
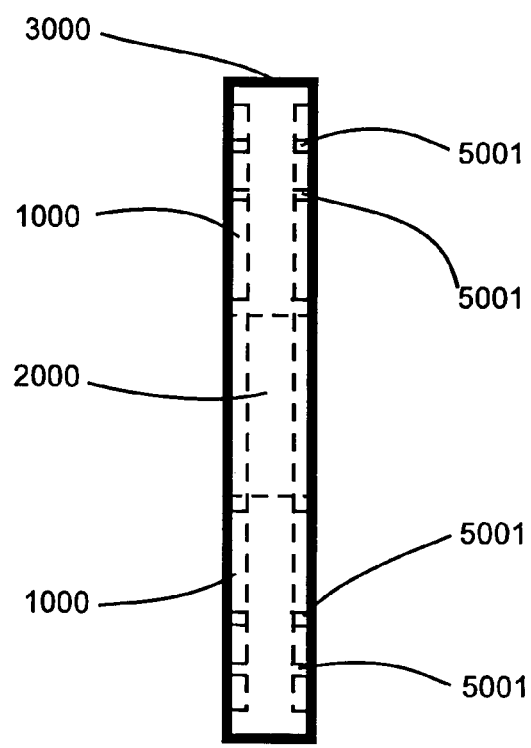
FIG. 10 is a side view of the electrode plate in FIG. 9.

FIG. 10 is a side view of the electrode plate in Fig.

Figure 11:
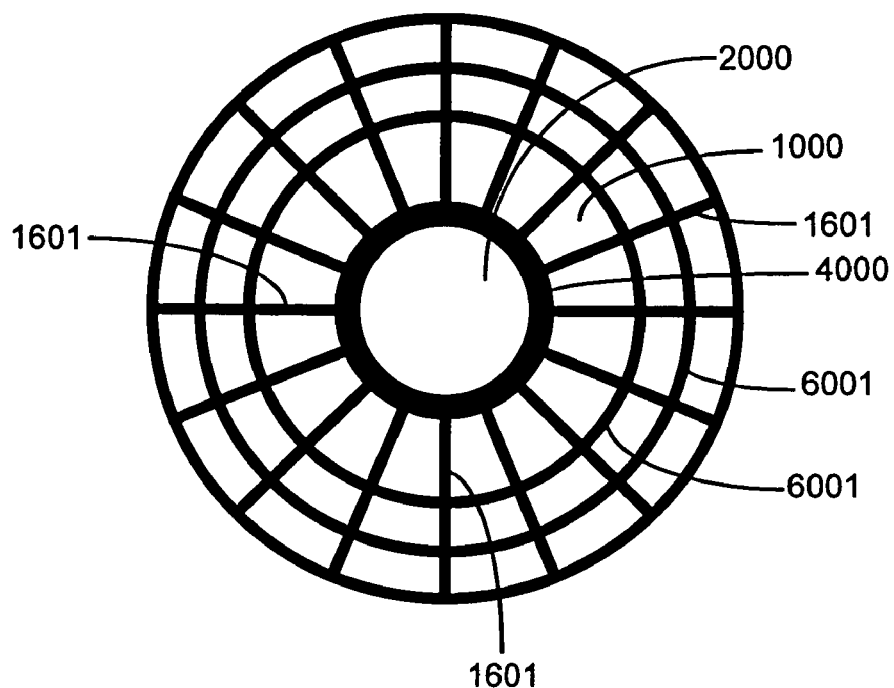
FIG. 11 is a schematic view showing a preferred embodiment of the present invention applied in an electrode plate having a circular through hole at the center as an I/O terminal and provided with a multi-directional convergence structure.

FIG. 11 is a schematic view of a preferred embodiment of the present invention, in which an electrode plate has a through hole at the center as an I/O terminal, and has a multi-directional convergence construction in radial pattern.

Figure 12:
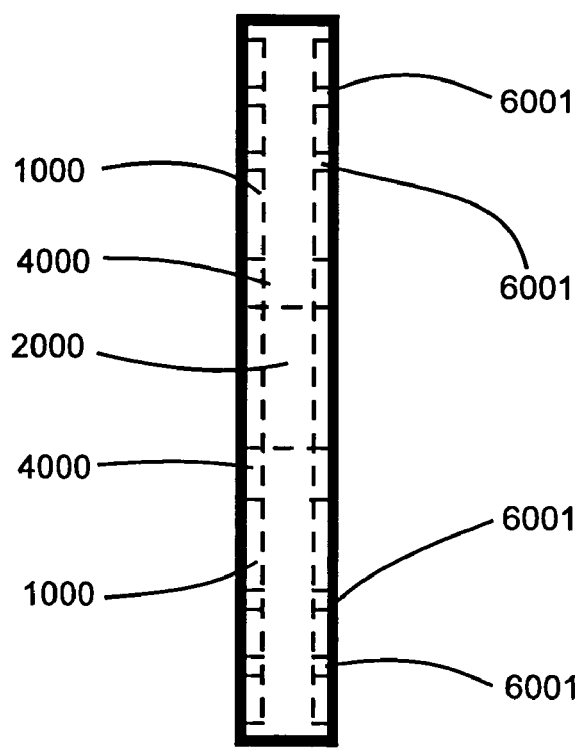
FIG. 12 is a side view of the electrode plate in FIG. 11.

FIG. 12 is a side view of the electrode plate in FIG. 11.

As illustrated in FIGS. 9, 10, 11, and 12 for the preferred embodiments of the present invention, a circular electrode plate 1000 has a through hole 2000 at its center, and the diameter of the electrode plate and the diameter of the central through hole 2000 are different when the electrode plates are respectively connected to a positive or negative I/O terminal. As illustrated in FIG. 9, the electrode plate with a greater outer diameter also has an inner through hole of greater diameter. A conductive frame 3000 is provided on the outer circumference of the electrode plate 1000 to form the I/O terminal; and multiple conductive structures 1501 are distributed in radial on the electrode plate with the conductive frame 3000 serving as a convergence I/O terminal. Circular conductive structures 5001 are provided in an alternate embodiment of the present invention. As illustrated in FIG. 11, the electrode plate with a smaller outer diameter also has an inner through hole 2000 of smaller diameter. A conductive frame 4000 is provided on the circumference of the circular through hole 2000 to constitute an I/O terminal and multiple conductive structures 1601 are disposed in radial on the electrode plate having the conductive frame 4000 surrounding the central through hole 2000 as the convergence I/O terminal. Circular conductive structures 6001 may be provided in an alternate embodiment of the present invention.

In those preferred embodiments of the electrode plate where the radial conductive structures cross one another, a loop conductive structure 7000 in circular, polygonal, or any other geometric shape as illustrated in FIG. 7 may be provided to replace the crossing point to avoid forming acute crossing angles for facilitating the attachment of active substance coated and for achieving better conductivity.

The present invention is related to an electrode plate with a multi-directional convergence structure in a radial pattern, for an electricity storage device, wherein individual convergence terminals are disposed on the periphery in all directions on the electrode plate to distribute a plurality of multi-directional conductive structures in radial pattern towards the center of the electrode plate to improve the equalization of I/O current flows from the electrode plate as a whole and reduces internal impedance. The present invention is innovative with specific functions and has never been disclosed before in the prior arts. Therefore, this application is duly filed accordingly.

The invention claimed is:

1. An electrode plate for an electricity storage and discharge device, comprising:
    a plurality of I/O convergence terminals evenly distributed along a periphery of the electrode plate; and
    a plurality of conductive structures, each conductive structure for one of the I/O convergence terminals; wherein
        each conductive structure is of a radial pattern that centers on the one of the I/O convergence terminals, and radiates towards the interior of the electrode plate;
        the periphery of the electrode plate comprises a conductive frame that includes a first side, a second side that is opposite to the first side, a third side, and a fourth side that is opposite to the third side;
        a first one of the I/O convergence terminals is disposed on the first side;
        a second one of the I/O convergence terminals is disposed on the second side, diagonal to the first one of the I/O convergence terminals;
        a third one of the I/O convergence terminals is disposed on the third side; and
        a fourth one of the I/O convergence terminals is disposed on the fourth side, diagonal to the third one of the I/O convergence terminals.

2. The electrode plate of claim 1, wherein the conductive frame comprises a plurality of edges that includes the first, second, third and fourth sides.

3. An electrode plate for an electricity storage and discharge device, comprising:

a plurality of I/O convergence terminals evenly distributed along a Periphery of the electrode plate; and a plurality of conductive structures, each conductive structure for one of the I/O convergence terminals; wherein each conductive structure is of a radial pattern that centers on the one of the I/O convergence terminals, and radiates towards the interior of the electrode plate;

the periphery of the electrode plate comprises a conductive frame that includes a first side, a second side that is opposite to the first side, a third side, and a fourth side that is opposite to the third side;

a first two of the I/O convergence terminals are disposed on the first side;

a second two of the I/O convergence terminals are disposed on the second side, diagonal to the first two of the I/O convergence terminals, respectively;

a third two of the I/O convergence terminals are disposed on the third side; and a fourth two of the I/O convergence terminals are disposed on the fourth side, diagonal to the third two of the I/O convergence terminals, respectively.

4. An electrode plate for an electricity storage and discharge device, comprising:

a plurality of I/O convergence terminals evenly distributed along a periphery of the electrode plate; and a plurality of conductive structures, each conductive structure for one of the I/O convergence terminals; wherein each conductive structure is of a radial pattern that centers on the one of the I/O convergence terminals, and radiates towards the interior of the electrode plate, the electrode plate is a circular electrode plate with a central through hole, resulting an outer and an inner peripheries of the electrode plate, the conductive structures includes a plurality of conductive bars connecting the outer and inner peripheries of the electrode plate in radial directions, each conductive bar is connected to one of the I/O convergence terminals, and the radii of the electrode plate and the through hole are different when the electrode plate is used for a positive or a negative electrode.

* * * * *